(No Model.)
W. P. ALLEN.
AUTOMATIC CLUTCH FOR DRIVING MECHANISM.
No. 464,447. Patented Dec. 1, 1891.
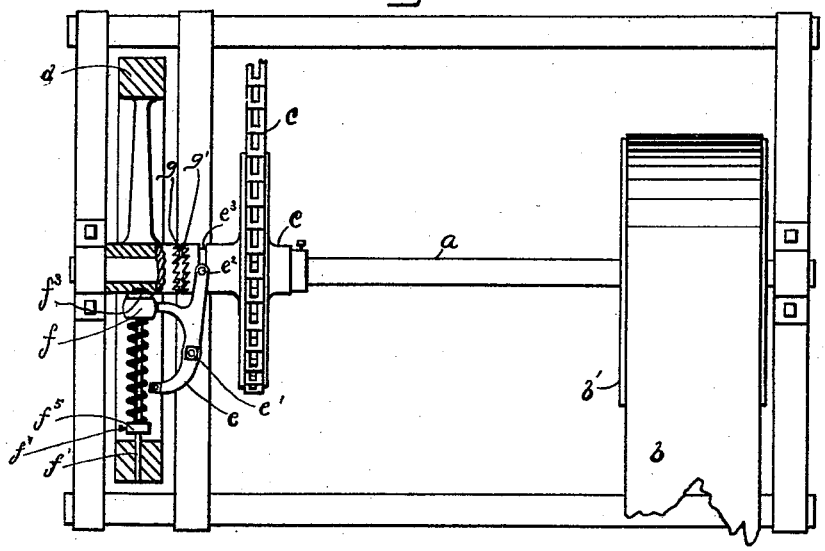
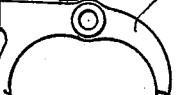
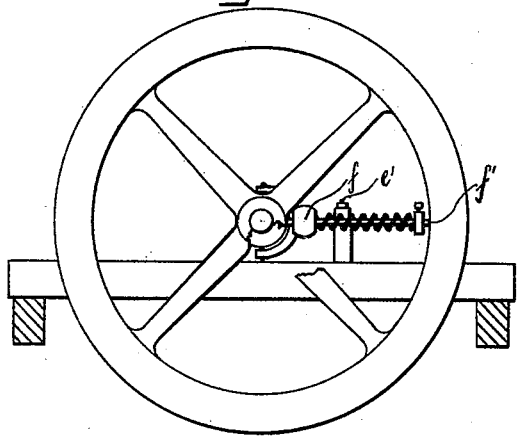
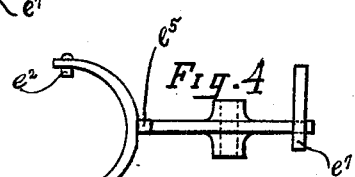
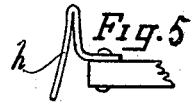
WITNESSES
D. H. Graham
O. Edwards
INVENTOR
William P. Allen
By

UNITED STATES PATENT OFFICE.

WILLIAM P. ALLEN, OF WYOMING, ASSIGNOR TO THE LITTLE GIANT POWER CONVERTER COMPANY, OF CINCINNATI, OHIO.

AUTOMATIC CLUTCH FOR DRIVING MECHANISM.

SPECIFICATION forming part of Letters Patent No. 464,447, dated December 1, 1891.

Application filed July 9, 1890. Serial No. 358,128. (No model.)

*To all whom it may concern:*

Be it known that I, WILLIAM P. ALLEN, a citizen of the United States, residing at Wyoming, in the county of Hamilton and State of Ohio, have invented certain new and useful Improvements in Automatic Clutches for Driving Mechanism, of which the following is a specification.

My invention relates to improvements in automatic clutches for driving mechanism.

The object of my invention is to provide an automatic clutch especially adapted for use with driving mechanism connected with wind-engines.

It has become common to employ wind-engines for driving light machinery of different character for producing various operations, among which grinding-mills are very commonly employed for grinding feed, &c. The failure of the wind occasions frequent stoppage of the machinery; and with such mechanism as grinding-mills, where a stoppage occurs with the grinding plates or burrs full of grain, it is very difficult to start the mill again without an adjustment thereof, as the wind-wheel cannot gather sufficient momentum.

To overcome these difficulties is the principal object of my invention, though the device is by no means limited in its usefulness to this especial kind of machinery.

My invention consists in the various constructions and combinations of parts hereinafter described, and set forth in the claims.

In the accompanying drawings, Figure 1 represents a portion of the driving mechanism, which would be located between the source of power and the driven machinery. Fig. 2 is an end elevation, partly in section, of the same, some of the parts being broken away to better illustrate the operative features. Figs. 3 to 5, inclusive, are details of some of the parts hereinafter referred to.

Like parts are represented by similar letters of reference throughout the several views.

In the said drawings, $a$ represents a shaft, on which the power is received through a suitable belt $b$, operating upon a suitable pulley $b'$, the power being transmitted from the shaft to the mill or other machinery by a chain belt $c$ and sprocket-wheel $c'$ or by other suitable mechanism.

$d$ is a fly-wheel secured rigidly to the shaft and turning therewith. The sprocket-wheel $c'$, however, turns loosely on the shaft, and is adapted to be moved longitudinally thereon by a bifurcated lever $e$, which is pivoted at $e'$ and provided with projections $e^2$, which engage in a groove $e^3$ in the hub of said wheel. (See Figs. 1 and 5.) The lever $e$ is provided on each side of its pivotal point $e'$ with projections $e^5$ and $e^7$, which are adapted to come in contact with a sliding weight $f$, located on the fly-wheel $d$ and adapted to slide on a rod $f'$, which extends from the rim to the hub of said wheel. A spring $f^2$ is placed between the rim of the wheel and the weight $f$, and a rubber cushion $f^3$ is preferably placed between the said weight and the hub of the wheel. The tension of the spring $f^2$ is adapted to be adjusted by a movable collar $f^5$, located on the rod $f'$ and adapted to be held in different positions thereon by a set-screw or other suitable means $f^7$. The hub of the fly-wheel $d$ is provided at one end with a series of projections adapted to form a clutch-face $g$, the adjacent end $g'$ of the hub of the sprocket-wheel $c'$ being similarly formed.

In the operation of the device the clutch-faces of the fly-wheel and sprocket-wheel, respectively, are in engagement, and the sprocket-wheel $c'$ turns with the shaft $a$. As the speed of the fly-wheel increases or diminishes, the weight $f$ slides outwardly or inwardly on the rod $f'$, being operated in one direction by centrifugal force and in the opposite direction by the spring $f^2$. The weight is thus brought in contact with the projections $e^5$ and $e^7$ of the lever $e$, as the case may be, and thus throws the sprocket-wheel $c'$ out of or into engagement with the fly-wheel $d$. By this arrangement before the power stops the mill or other mechanism is thrown out of gear. It remains out of gear until sufficient speed is obtained to throw the weight outwardly sufficiently to engage with the projection $e^7$, when the sprocket-wheel is again thrown into gear and the mechanism thus started. The stop projection $e^5$, which throws the clutch-face out of gear, may be formed rigid on the lever $e$. I preferably provide the stop projection $e^7$, however, with a yielding portion, preferably formed in the nature of a U-shaped spring $h$. (See Fig. 6.) This spring $h$ is made with sufficient tension to throw the clutch into gear; but if the parts do not mesh properly, or for any reason the clutch sticks, the clutch will permit the weight to pass the lever without breakage of parts.

In order to do away with the friction as far as possible, I make the weight $f$ in the nature of a roller adapted to turn on the rod $f'$ in passing the different projections.

It will be seen by the above construction that a device simple in construction and operation is secured, by means of which the driven machinery is automatically released from the driving mechanism when the speed is reduced and again automatically thrown into gear with said driving mechanism when the speed is increased to the proper degree.

Having thus described my invention, I claim—

1. The combination, with a driving-shaft and a fly-wheel thereon, of a driving-wheel normally disconnected from said shaft, but adapted to be connected thereto to transmit motion therefrom, a sliding weight in said fly-wheel, and a clutch mechanism adapted to be engaged or disengaged and thus engage or disengage said driving-wheel, substantially as specified.

2. The combination, with a shaft and a fly-wheel thereon, of a driving-wheel loosely supported on said shaft, clutch-faces on said driving-wheel and fly-wheel, respectively, a pivoted lever adapted to operate said clutch, and a sliding weight in said fly-wheel, adapted when moved to different positions to engage said pivoted lever either side of its pivotal center, substantially as specified.

3. The combination, in a driving mechanism, of a sliding clutch and a pivoted lever to operate the same, and a sliding weight located in a revolving wheel connected to said driving mechanism, and engaging projections on said pivoted lever on each side of the pivotal center thereof, said engaging projections being adapted to come in contact with the sliding weight when moved to different positions by the centrifugal force of said revolving wheel, substantially as specified.

4. The combination, in a driving mechanism, of a clutch adapted to be engaged and disengaged by a pivoted lever, a fly-wheel connected with said driving mechanism, a sliding weight in said fly-wheel, adapted when moved to different positions to engage with said pivoted lever on the opposite sides of its pivotal center to operate said clutch, a spring acting against said sliding weight, and means for adjusting the tension of said spring, substantially as specified.

5. The combination, with the detachable clutch and its operating-lever, of a revolving wheel having a sliding weight therein, adapted to engage with said pivoted lever on either side of the pivotal point thereof, and a yielding projection on said pivoted lever, adapted to be contacted with by said sliding weight, substantially as specified.

6. The combination, with a detachable clutch and its operating-lever, of a revolving wheel and a sliding weight therein, said sliding weight being journaled on a rod on which it is adapted to slide and adapted to come in contact with different points of said operating-lever to cause said clutch to be engaged and disengaged, whereby a rolling movement of said weight is secured when in contact with said lever, substantially as specified.

7. The combination, with a detachable clutch and a revolving wheel, of a pivoted operating clutch-lever and a sliding weight in said wheel, an adjustable spring operating against said sliding weight and the centrifugal force of said wheel, and a yielding projection on said operating-lever, with which said weight is adapted to engage, said weight being formed in the nature of a roller and journaled on its sliding bearing, so as to turn when brought in contact with said operating-lever or its engaging projections, substantially as specified.

In testimony whereof I have hereunto set my hand this 30th day of June, A. D. 1890.

WILLIAM P. ALLEN.

Witnesses:
ALFRED M. ALLEN,
J. W. MERRILL.